United States Patent
Smith

(10) Patent No.: US 6,393,265 B1
(45) Date of Patent: May 21, 2002

(54) METHOD AND APPARATUS FOR TWO DIMENSIONAL FILTERING IN A COMMUNICATIONS SYSTEM USING A TRANSFORMER SYSTEM

(75) Inventor: Stephen H. Smith, Leucadia, CA (US)

(73) Assignee: Smith Technology Development LLC., San Diego, CA (US)

( * ) Notice: Subject to any disclaimer, the term of this patent is extended or adjusted under 35 U.S.C. 154(b) by 0 days.

(21) Appl. No.: 09/436,763

(22) Filed: Nov. 9, 1999

Related U.S. Application Data

(60) Provisional application No. 60/135,098, filed on Nov. 9, 1998.

(51) Int. Cl.[7] ................................................. H04B 1/18
(52) U.S. Cl. ...................................... 455/292; 455/293
(58) Field of Search ................................. 455/118, 129, 455/260, 292, 293, 562, 121; 336/170, 171, 184

(56) References Cited

U.S. PATENT DOCUMENTS

| 4,225,914 A | * | 9/1980 | Hirata et al. ................ 363/160 |
| 4,498,127 A | * | 2/1985 | Fiorina ........................... 363/5 |
| 5,541,830 A | * | 7/1996 | Moore et al. .................. 363/69 |
| 5,627,712 A | * | 5/1997 | Wilkinson .................... 361/63 |

* cited by examiner

*Primary Examiner*—Daniel Hunter
*Assistant Examiner*—Tuan Tran
(74) *Attorney, Agent, or Firm*—Kenyon & Kenyon

(57) ABSTRACT

A transformer system comprises a transformer star winding to be coupled to an antenna system, and a transformer delta winding disposed with said transformer star winding. The transformer star winding includes a set of star elements and the transformer delta winding includes a set of delta elements each being substantially perpendicularly disposed with a corresponding star element from the set of star elements.

36 Claims, 8 Drawing Sheets

METHOD AND APPARATUS FOR TWO DIMENSIONAL FILTERING IN A COMMUNICATIONS SYSTEM USING A TRANSFORMER SYSTEM

This application claims the benefit under 35 U.S.C. § 119(e) of Provisional application No. 60/135,098 filed Nov. 9, 1998.

CROSS-REFERENCE TO RELATED APPLICATIONS

This application is related to U.S. patent application No. 08/853,833, entitled "Communications System," filed May 9, 1997, now U.S. Pat. No. 6,204,810, and U.S. patent application No. 09/064,525 entitled "Communication System," filed Apr. 23, 1998, now U.S. Pat. No. 6,271,790, the entire contents of which are hereby incorporated by reference.

This application is related to the subject matter of the following U.S. applications filed concurrently: U.S. patent application No. 09/436,236 entitled "Adjustable Balanced Modulator," pending, U.S. patent application No. 09/436,531 entitled "System For Measuring and Displaying Three-Dimensional Characteristics of Electromagnetic Waves," now U.S. Pat. No. 6,295,025, U.S. patent application No. 09/436,144 entitled "Cavity-Driven Antenna System," now U.S. Pat. No. 6,317,097, U.S. patent application No. 09/437,892 entitled "Disc Antenna System," now U.S. Pat. No. 6,340,950, and U.S. patent application No. 09/436,400 entitled "Two-Dimensional Amplifier," pending.

BACKGROUND OF THE INVENTION

The present invention relates generally to transformer systems. More specifically, the present invention relates to a transformer system used in a communication system to perform two dimensional filtering.

Known communications systems use, for example, filters to respond differently to signals of different frequencies. Passive filters, for example, are constructed with passive elements such as resistors, inductors and capacitors. Filters can be categorized by type: low pass filters filter out higher frequencies, high pass filters filter out lower frequencies, bandpass filters filter out lower and higher frequencies while passing middle frequencies defined by the pass band, notch filters pass lower and higher frequencies while filtering out middle frequencies defined by the stop (or notch) band.

Used in conjunction with a communications receiver system, filters operate on electrical signals detected by the receiver system based on the electromagnetic wave received at the receiver antenna. In the context of a communications transmitter system, filters operate on electrical signals produced by the transmitter system and propagated as an electromagnetic wave via the transmitter antenna. In the communications system context, filters can remove electrical signal components at particular frequencies that are undesirable and can represent, for example, unwanted noise, harmonics, and/or intermodulation products.

These known filtering techniques for communications systems, however, suffer several shortcomings. These filtering techniques are "one-dimensional" in the sense that the filtering is performed regardless of the orientation of the electromagnetic wave received and transmitted by the communications system receive antenna and transmit antenna, respectively.

In other words, these filtering techniques are of limited use to process signals that are based on information-modulated electromagnetic waves having a particular and varying orientation, for example, to establish a particular information channel. For example, such an electromagnetic wave can have a carrier frequency and an electric field the terminus of which traces a non-linear path at a second frequency between the carrier frequency and zero. Above-mentioned U.S. patent application No. 09/064,525 ("Communication System") discloses a communications system that utilizes such an electromagnetic wave.

In view of the foregoing, a substantial need exists for filtering techniques that account for the orientation of the electromagnetic wave received by a communications receiver and transmitted by a communications transmitter. Such filtering techniques can be referred to as "two-dimensional" filtering.

SUMMARY OF THE INVENTION

Two-dimensional filtering for a communications system can be performed by a transformer system. The transformer system comprises a transformer star winding to be coupled to an antenna system, and a transformer delta winding disposed with said transformer star winding. The transformer star winding includes a set of star elements and the transformer delta winding includes a set of delta elements each being substantially perpendicularly disposed with a corresponding star element from the set of star elements.

In one embodiment, the antenna system includes a set of antenna elements. The transformer star winding includes a set of star elements the number of which are substantially equal to the number of antenna elements in the plurality of antenna elements. The transformer delta winding includes a set of delta elements the number of which are substantially equal to the number of antenna elements in the plurality of antenna elements.

DETAILED DESCRIPTION

Figure 1:
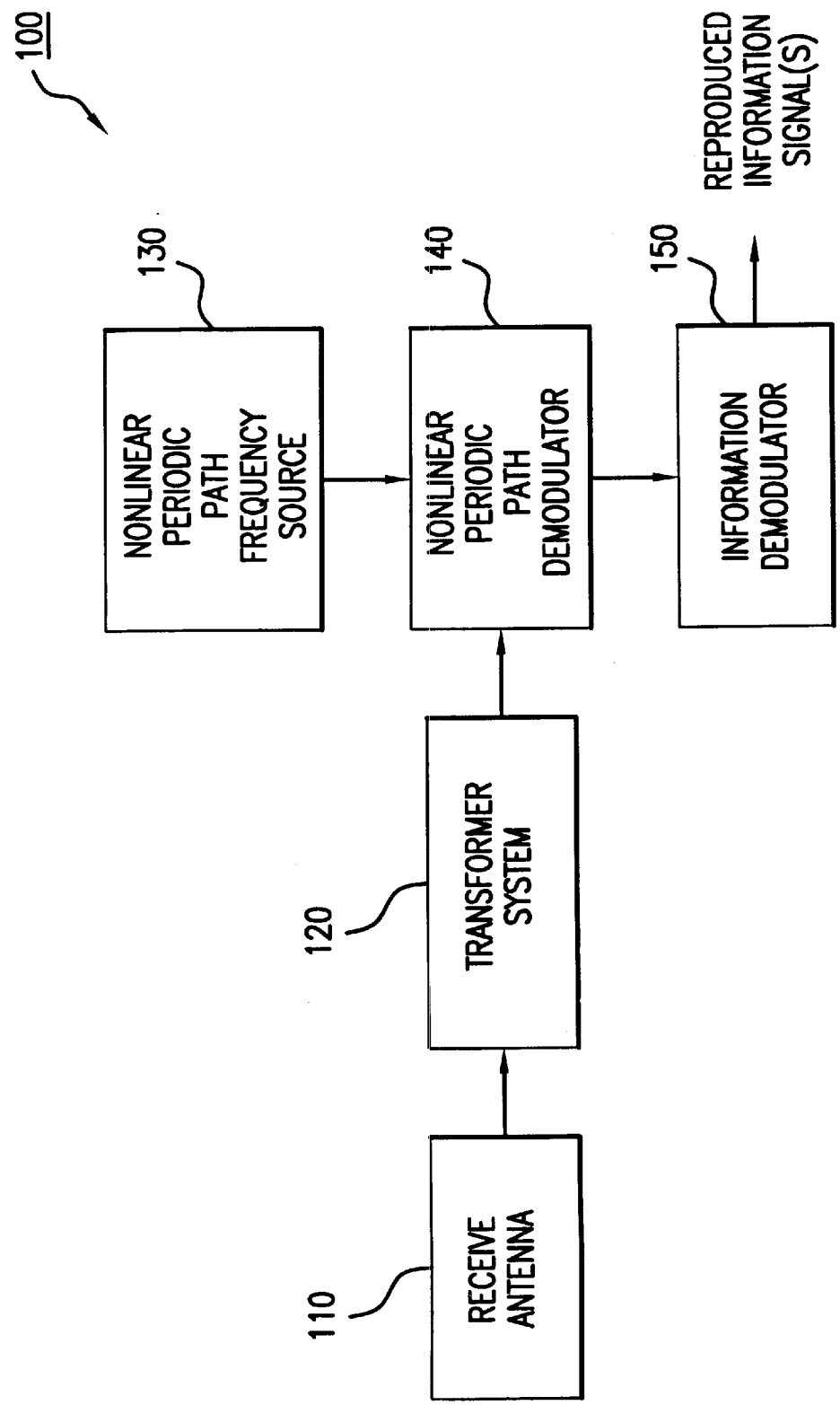
FIG. 1 illustrates a block diagram of a communications receiver system using a transformer system according to an embodiment of the present invention.

FIG. 1 illustrates a system block diagram of a communications receiver system using a transformer system according to an embodiment of the present invention. Receiver system 100 includes a receive antenna 110 coupled to transformer system 120 which is in turn coupled to nonlinear periodic path demodulator 140. Nonlinear period path demodulator 140 is coupled to nonlinear period path frequency source 130 and information demodulator 150.

Above-mentioned U.S. patent application No. 09/064,525 ("Communication System") described a communications receiver system similar to that shown in FIG. 1. Although the receiver system will be briefly described below, the above-mentioned patent application No. 09/064,525 should be referenced for further details and description for all of the system components except for the transformer system 120 which is discussed herein.

Receive antenna 110 can send a signal to transformer 120 based on a received electromagnetic wave. The received electromagnetic wave can include, for example, a number of constituent waves such a linear polarized waves, elliptical polarized waves and waves having a time-varying orientation. For example, these later waves can have a carrier frequency and an electric field vector the terminus of which traces a non-linear path at a second frequency between the carrier frequency and zero. The nonlinear period path of these later waves can, for example, establish a communications channel; these waves can also carry information modulated onto signals generated in the process of transmitting the waves (see the discussion of the transmitter system below).

Transformer 120 can filter the received signals so that signals associated with linear and elliptical polarized waves (referred to herein as "linear waves") are filtered out and signals associated with waves having a time-varying orientation (referred to herein as "nonlinear waves") are passed to the nonlinear periodic path demodulator 140. The nonlinear periodic path demodulator 140 also receives a signal from the nonlinear period path frequency source to produce a demodulated signal which is sent to the information demodulator 150. The information demodulator 150 further demodulates the received demodulated signal based on a carrier frequency to produce the information signal.

Figure 2:
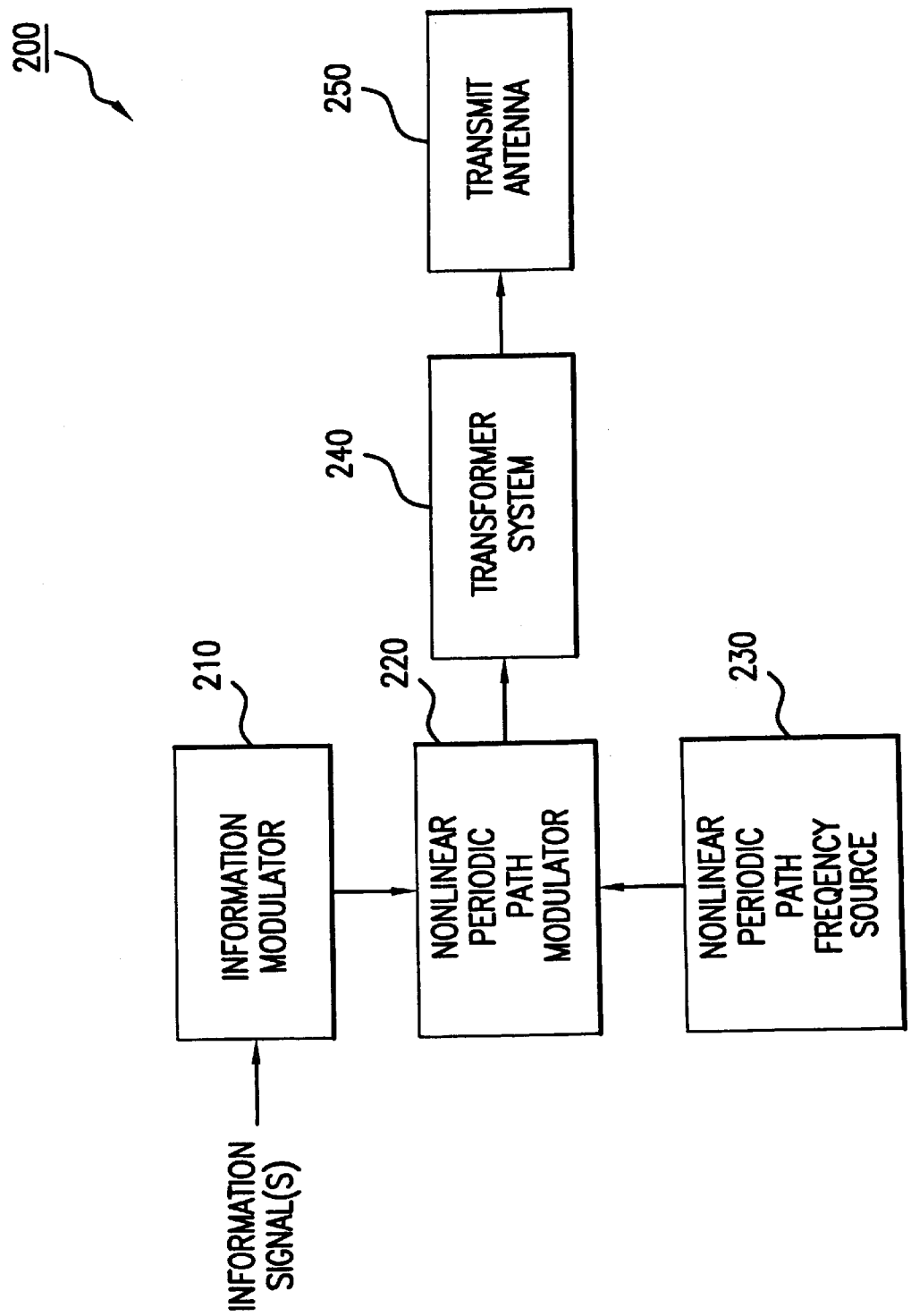
FIG. 2 illustrates a block diagram of a communications transmitter system using a transformer system according to an embodiment of the present invention.

FIG. 2 illustrates a system block diagram of a communications transmitter system using a transformer system according to an embodiment of the present invention. The embodiment of the transmitter system shown in FIG. 2 can be used in conjunction with the receiver system described above in reference to FIG. 1. Again, although the transmitter system will be briefly described below, the above-mentioned patent application No. 09/064,525 ("Communication System") should be referenced for further details and description for all of the system components excepted for the transformer system 240 which is discussed herein.

Transmitter system 200 includes an information modulator 110 coupled to nonlinear period path modulator 220 which is also coupled to nonlinear periodic path frequency source 230 and transformer system 240. Transformer system 240 is also coupled to transmit antenna 250.

Information modulator 210 can modulate a carrier frequency with a received information signal and send this signal to the nonlinear period path modulator 220 which also receives a signal from the nonlinear periodic path frequency source 230. The nonlinear periodic path modulator 220 modulates the signal received from the information modulator 210 with signal received from the nonlinear periodic path frequency source 230 to produce a signal to transformer system 240.

Transformer system 240 can filter the received signals so that signals once transmitted by transmit antenna 250 that would be associated with linear waves are filtered out and signals that would be associated with nonlinear waves are passed to the transmit antenna 250. Transmit antenna 250 sends an electromagnetic wave having the carrier frequency and an electric field vector the terminus of which traces a non-linear path at a second frequency between the carrier frequency and zero.

Figure 3B:
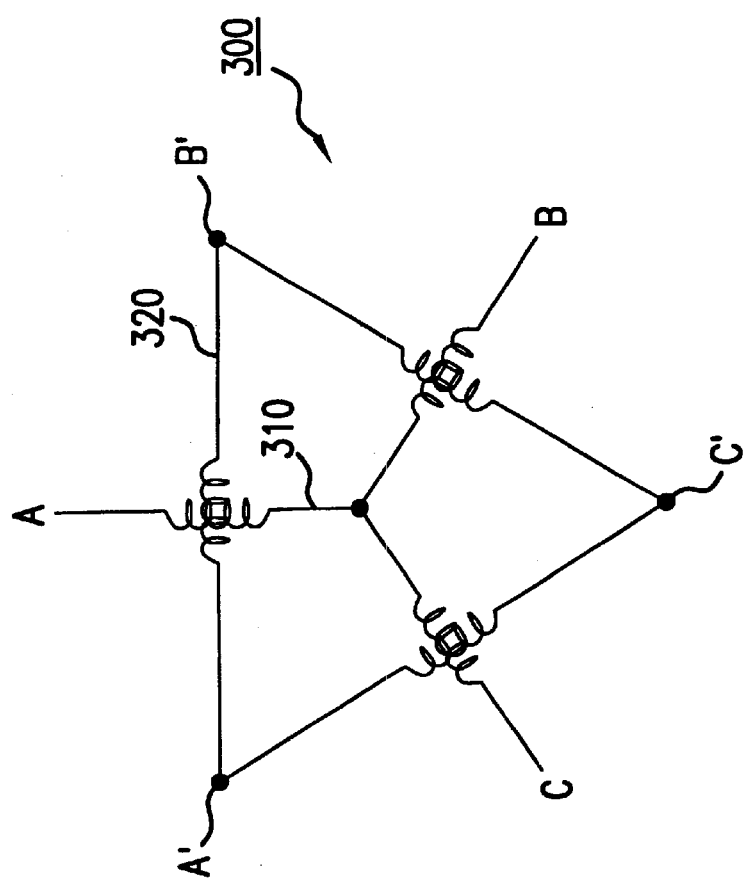
FIG. 3 provides an electrical schematic of a transformer system coupled to an antenna system according to an embodiment of the present invention.
Figure 3A:
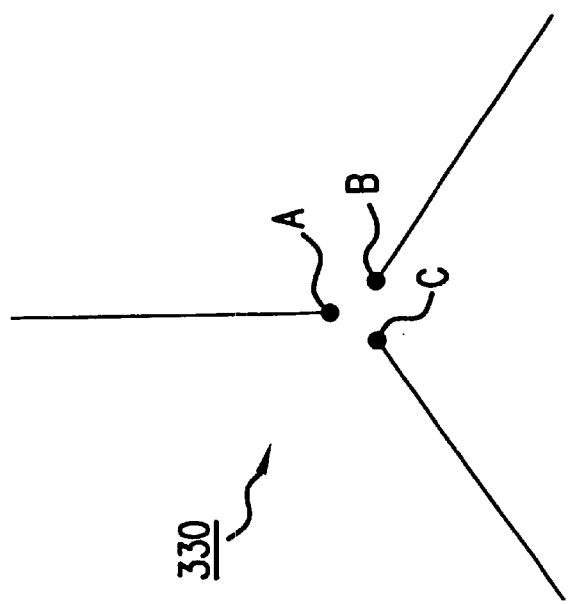

FIG. 3 provides an electrical schematic of a transformer system coupled to an antenna system according to an embodiment of the present invention. The transformer system 300 shown in FIG. 3 can be used for the transformer system 120 of the receiver system 100 shown in FIG. 1 and can be used for the transformer system 240 of the transmitter system 200 shown in FIG. 2.

Transformer system 300 includes a transformer star winding 310 and a transformer delta winding 320. Antenna system 330 is coupled to the transformer star winding 310 and has three monopole antenna elements. Transformer star winding 310 and transformer delta winding 320 each have three legs.

Transformer star winding 310 is disposed with transformer delta winding 320 so that the two transformer windings can inductively interact. The term "disposed with" is herein to include, but is not exclusively limited, to the physical arrangement of the transformer star winding 310 in conjunction with the transformer delta winding 320. The physical arrangement of the two sets of windings can include, for example, the vertical arrangement and/or the angular orientation of the transformer star winding 310 with respect to the transformer delta winding 320.

The particular manner in which transformer star winding 310 is disposed with transformer delta winding 320 will depend on the particular implementation of the transformer system 300. For example, where the transformer system 300 is implemented in a microstrip as appropriate for a particular transmission frequency(ies) of interest, the transformer star winding 310 can be vertically adjacent to (i.e., on top of) the transformer delta winding 320. In another implementation, where the transformer system 300 is implemented with an iron core, the windings can be wound together around the arms of the iron core.

FIG. 3 illustrates a particular angular orientation between the transformer star winding 310 and the transformer delta winding 320. In particular, the transformer star winding 310 is arranged with respect to the transformer delta winding 320 so that each leg of the transformer star winding 310 is substantially perpendicular to a corresponding leg of the transformer delta winding 320.

The transformer star winding 310, however, need not be angularly arranged exactly perpendicular to the transformer delta winding 320. The term "substantially perpendicular" is used herein to mean perpendicular as well as an range of angles offset from perpendicular, for example, angles plus or minus twenty degrees (±20°) offset from perpendicular. Although other ranges of angles offset from perpendicular may be possible, plus or minus twenty degrees is given as an example because this range of angles is within approximately 94% of the perpendicular case as represented by a cosine function. In embodiments of the transformer system where the transformer star winding is disposed with the transformer delta winding at an angle offset from perpendicular within this range, the transformer system can operate sufficiently without the need for compensation or correction.

In some embodiments of the transformer system where the transformer star winding and the transformer delta winding are offset from perpendicular outside an acceptable angular range, a phase lock loop can be used to compensate for the non-perpendicular arrangement. In other words, where he transformer star winding and the transformer delta winding are not disposed substantially perpendicular in the physical sense, the windings can be disposed substantially perpendicular in the electrical sense due to the compensation performed by the phase lock loop.

Figure 4B:
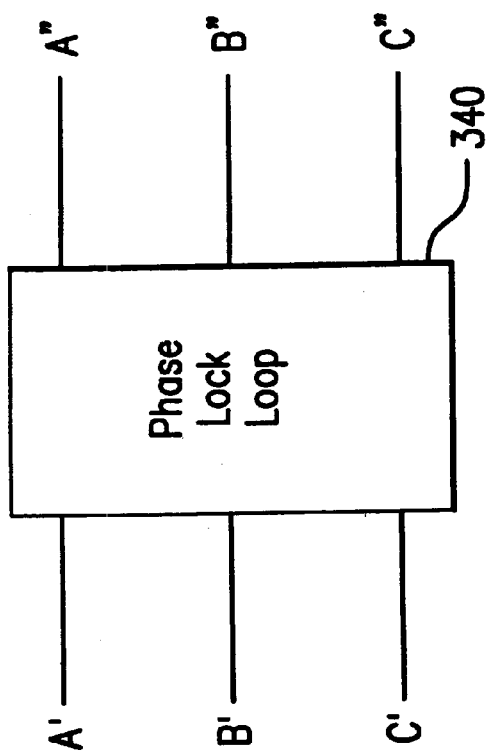
FIG. 4 illustrates an example of a transformer system with a non-perpendicular arrangement coupled to a phase lock loop, according to another embodiment of the present invention.
Figure 4A:
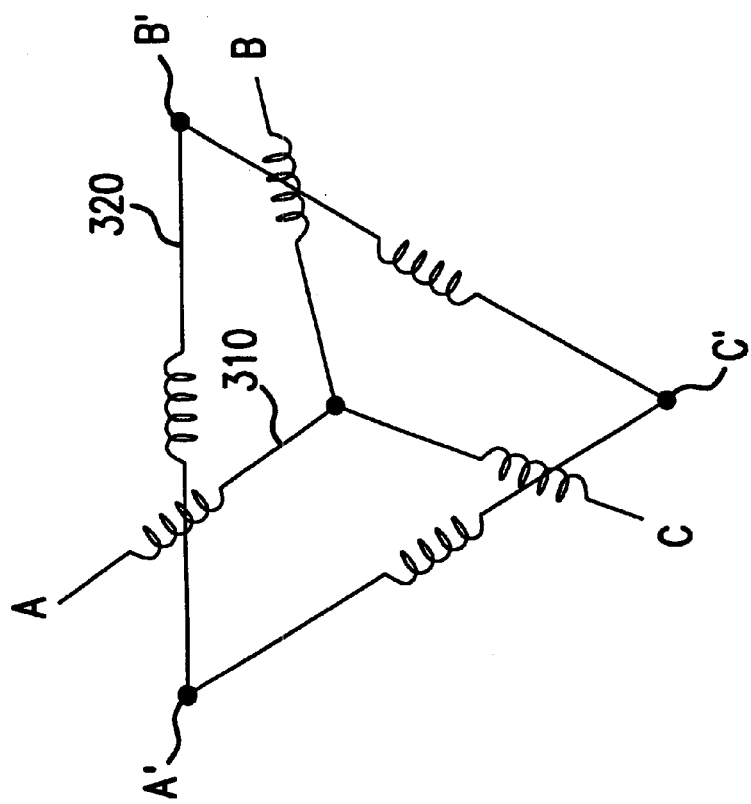

FIG. 4 illustrates an example of a transformer system with a non-perpendicular arrangement coupled to a phase lock loop, according to another embodiment of the present invention. Phase lock loop 340 can receive signals over lines A", B" and C" and then adjust the phase of these signals to compensate for the non-perpendicular arrangement of the transformer star winding 310 and the transformer delta winding 320. The output of the phase lock loop 340 is coupled to the transformer delta winding 320 over lines A', B' and C'.

Returning to FIG. 3, each leg of the transformer star winding 310 is coupled to a corresponding antenna element of antenna 330. As illustrated in FIG. 3, the antenna elements of antenna system 330 have leads labeled A, B and C which are coupled respectively to the legs of the transformer star winding 310 which respectively labeled A, B and C. The transformer delta windings 320 also have three leads labeled in FIG. 3 as A', B' and C'; these leads from the transformer delta windings 320 are the output of the transformer system 300. The outputs of the transformer system 300 are coupled to the nonlinear periodic path modulator or demodulator (for the receiver system or the transmitter system, respectively). Alternatively, the outputs of the transformer system 300 can be coupled to the nonlinear periodic path modulator/ demodulator through additional components (not shown in FIG. 3 for simplicity) such as nonlinear amplifiers (NLAs).

The transformer system 300 operates to perform two-dimensional filtering due to the physical arrangement of the two transformer windings 310 and 320. As an electromagnetic wave is received by receive antenna 330, the electromagnetic wave is converted into a first signal which is sent to the transformer star winding 310 via lines A, B and C. As the first signal is received by the transformer star winding 310, an electromagnetic field is established based on that first signal. This electromagnetic field can then be inductively coupled into the transformer delta winding 320. A second signal can then be generated in the individual legs of the transformer delta winding 320.

In embodiments of the transformer system where each leg of the transformer star winding is substantially perpendicular to a corresponding leg of the transformer delta winding, however, components of the second signal based on linear waves (e.g., linear polarized waves and elliptical polarized waves received by the receive antenna system) are not generated. Conversely, components of the second signal based on nonlinear waves (e.g., waves with a time-varying orientation) are generated as the outputs of the transformer system (e.g., via lines A', B' and C' for the embodiment shown in FIG. 4). Consequently, the transformer system filters linear waves and passes nonlinear waves. The transformer system can be considered a two-dimensional filter in the sense that received waves having time-varying orientations are passed through to the remaining components of the receiver system (e.g., nonlinear period path demodulator 140 and information demodulator 150 shown in FIG. 1) while linear waves are filtered out and do not pass to the remaining components of the receiver system. The analogous filtering can also performed for a transmitter system.

Figure 5:
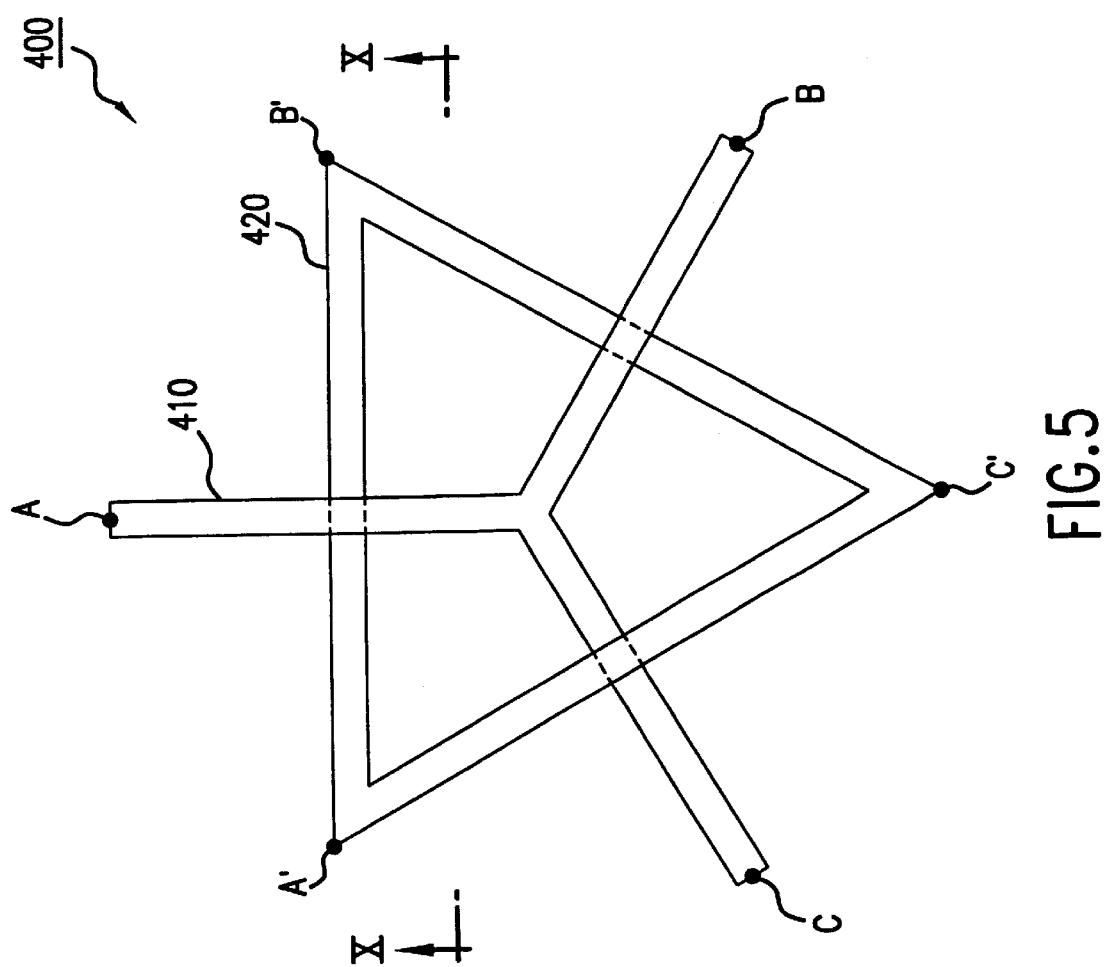
FIG. 5 illustrates a plan view of a microstrip implementation of a transformer system according to another embodiment of the present invention.

FIG. 5 illustrates a plan view of a microstrip implementation of a transformer system according to another embodiment of the present invention. Transformer system 400 includes transformer star winding 410 disposed with transformer delta winding 420. Note that the use of the terms "transformer star winding" and "transformer delta winding" are intended to be sufficiently broad to encompass transformer systems that are constructed with actual windings as well as transformer systems that are constructed without actual windings but function similarly.

The dimensions of the transformer system 400 can be selected based on the particular frequency of interest. In other words, as is known in the art, the length and width of legs for the transformer star winding 410 and the transformer delta winding 420 can be selected based on the carrier frequency(ies) of the electromagnetic wave received by the receiver system or transmitted by the transmitter system.

Figure 6:
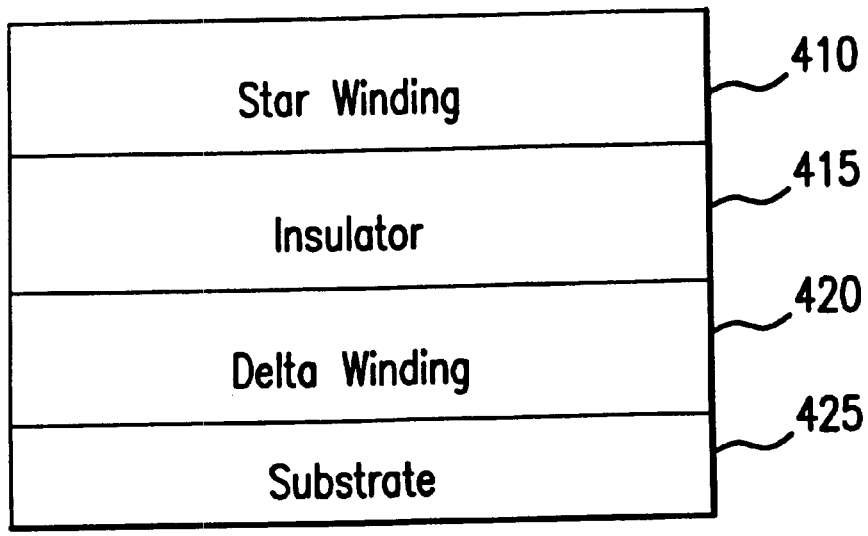
FIG. 6 illustrates a cross-sectional view of a microstrip implementation of the transformer system shown in FIG. 5 along line X.

FIG. 6 illustrates a cross-sectional view of a microstrip implementation of the transformer system shown in FIG. 5 along line X. Transformer delta winding 420 is disposed on a substrate 425. Transformer star winding 410 is separated by transformer delta winding 420 by an insulator layer 415. The height of insulator layer 415 (i.e., the distance between the transformer star winding 410 and the transformer delta winding 420) can be selected to allow inductive coupling, while preventing conductive coupling, between the transformer layers 410 and 420. In one embodiment, the insulator layer 415 is as small as possible thereby allowing inductive coupling while still preventing conductive coupling.

Figure 7:
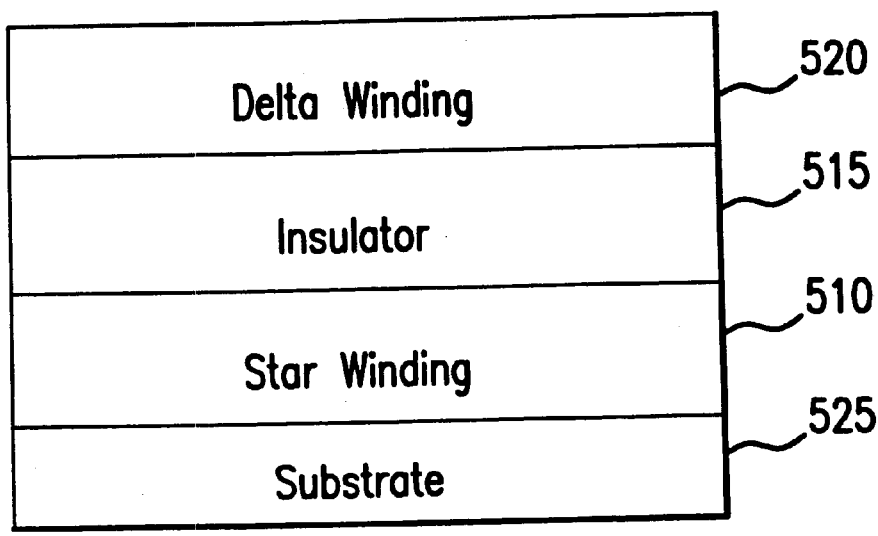
FIG. 7 illustrates a cross-sectional view of a microstrip implementation of a transformer system according to an embodiment of the present invention.

FIG. 7 illustrates a cross-sectional view of a microstrip implementation of a transformer system according to an embodiment of the present invention. Similar to the arrangement of the transformer windings shown in FIG. 5, the transformer star winding 510 is disposed on a substrate 525 and is separated from the transformer delta winding 520 by insulator layer 515. Again, the height of insulator layer 515 can be selected to allow inductive coupling, while preventing conductive coupling, between the transformer layers 510 and 520.

Although the embodiments discussed above assume that the antenna system for either the receiver or the transmitter have three monopoles angularly spaced within a plane about a common point, other antenna system configurations are possible; some of these other antenna system configurations are discussed in the above-mentiond U.S. patent application No. 09/064,525 ("Communication System"). The antenna system can have, for example nine angularly spaced monopoles. An embodiment of the transformer system used in conjunction with this nine-monopole antenna system can have, for example, nine legs in the transformer star winding disposed with nine legs in the transformer delta winding. Each antenna monopole can be coupled to a corresponding leg of the transformer star winding. Each leg of the transformer delta winding can be the output of the transformer system.

Figure 8:
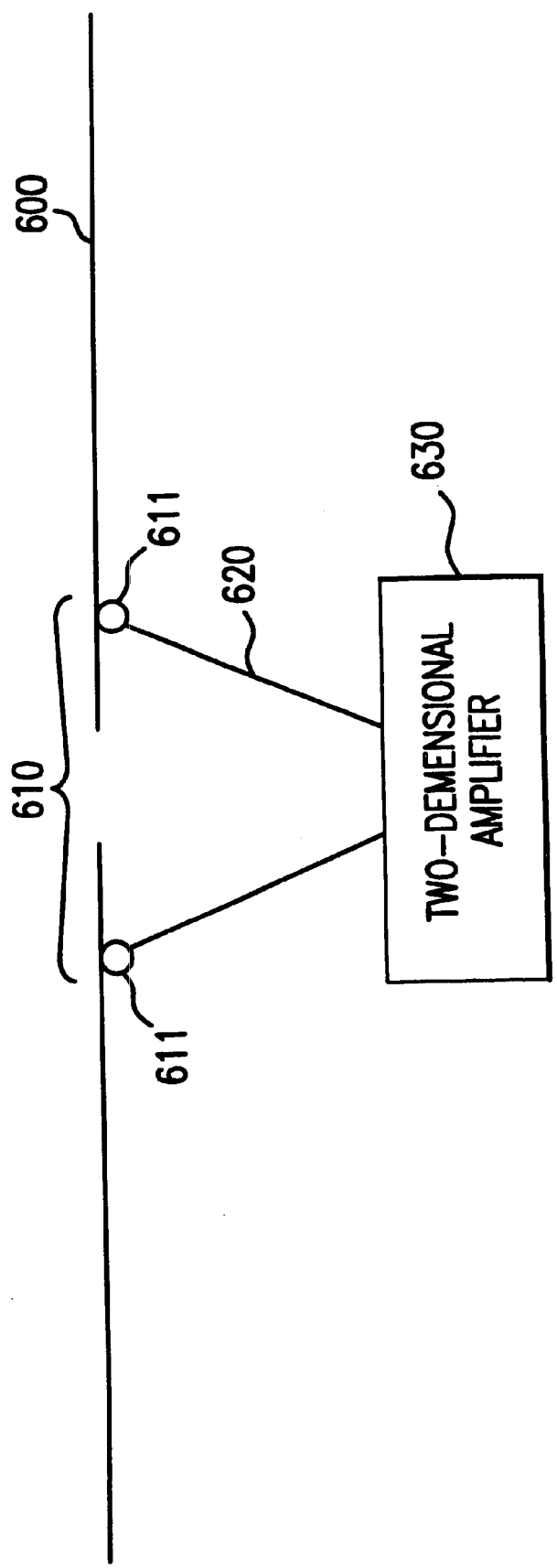
FIG. 8 illustrates a cross-sectional view of a solid disc antenna system and transformer system combined with the system block component of the two-dimensional amplifier, according to an embodiment of the present invention.
Figure 9:
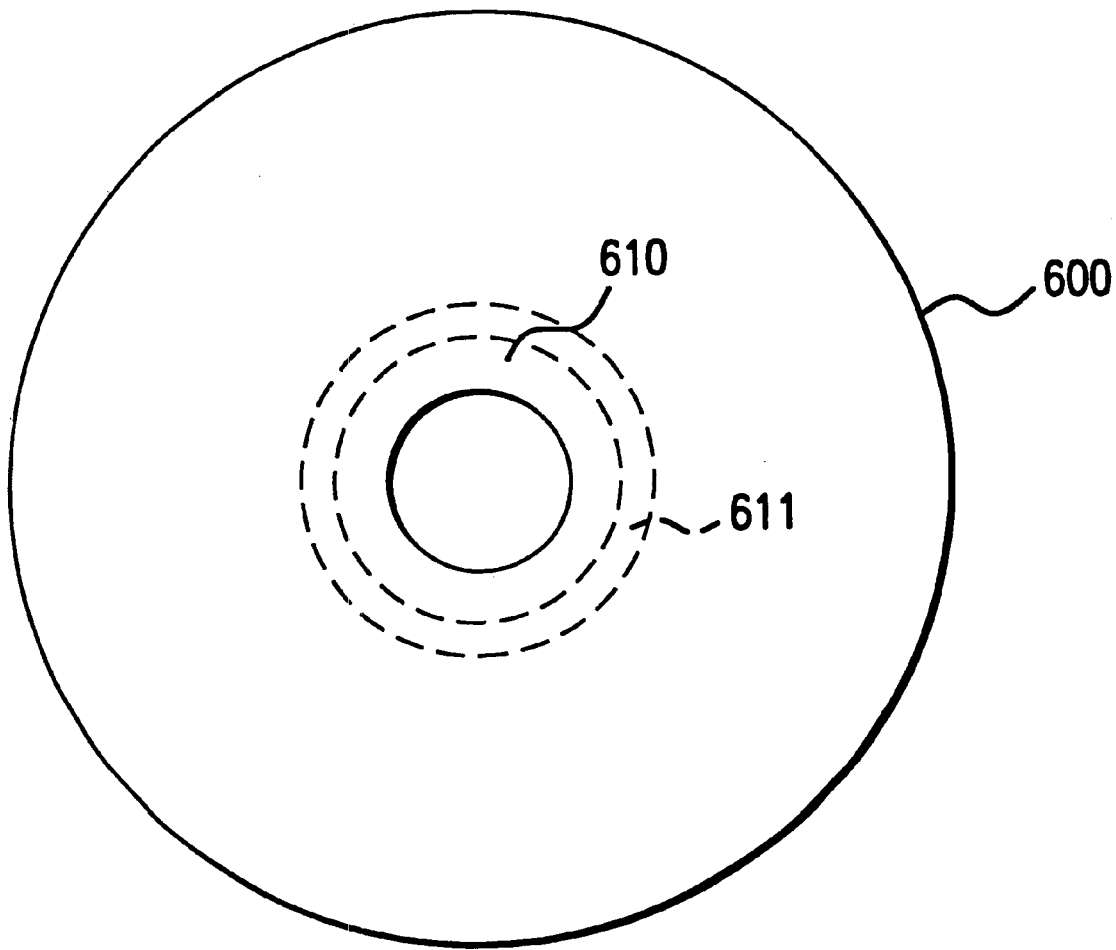
FIG. 9 illustrates a plan view of the solid disc antenna system and the transformer system shown in FIG. 8.

In other embodiments, the transformer system can be used in conjunction with the two-dimensional amplifier and the solid disc antenna system described in above-mentioned U.S. patent application No. 09/436,400 ("Two-Dimensional Amplifier") and above-mentioned U.S. patent application No. 09/437,892 ("Disc Antenna"), respectively, the entire contents of which are both hereby incorporated by reference. FIG. 8 illustrates a cross-sectional view of a solid disc antenna system and transformer system combined with the system block component of the two-dimensional amplifier, according to an embodiment of the present invention. FIG. 9 illustrates a plan view of the solid disc antenna system and the transformer system shown in FIG. 8.

Solid disc antenna system 600 is integrally formed with the transformer star winding 610. The transformer delta winding 611 is connected to the transformer star winding 610 at a point which defines where the transition between the solid disc. antenna 600 and the transformer star winding 610. The transformer delta winding 611 can be, for example, a loop configuration formed on a printed wiring board as a microstrip. The transformer delta winding 620 is connected to a coupling device 620 which is in turn connected to the two-dimensional amplifier 630. The specific configurations of the coupling device 620 and the specific manners in which the two-dimensional amplifier 630 can be coupled to the solid disc antenna system 600 is described in further detail in the respective co-pending patent applications described above.

It should, of course, be understood that while the present invention has been described in reference to particular component shapes and configurations, other component shapes and configurations should be apparent to those of ordinary skill in the art. For example, although the transformer system configurations discussed above have the number of legs in the transformer star winding and transformer delta winding equal each other and equal to the number of monopoles in the antenna system, other configurations are possible although not necessarily quite as effective. For example, where the antenna system has three monopoles, the transformer star winding can have three legs and the transformer delta winding can have four legs. To the extent that each leg of the transformer star winding is not substantially perpendicular with a corresponding leg of the transformer delta winding, this transformer system will operate less than optimally.

What is claimed is:

1. A transformer system, comprising:
   a transformer star winding to be coupled to an antenna system adapted to operated at radio frequencies (RF), said transformer star winding including a plurality of star elements; and
   a transformer delta winding having a plurality of delta elements each being substantially perpendicularly disposed with a corresponding star element from the plurality of star elements.

2. The transformer system of claim 1, wherein the plurality of star elements are disposed with the plurality of delta elements so that the plurality of star elements are inductively coupled to the plurality of delta elements.

3. The transformer system of claim 1, further comprising a phase lock loop system coupled to the plurality of delta elements, the phase lock loop system providing a phase adjustment to a signal received from the plurality of delta elements, the phase adjustment corresponding to an offset from perpendicular between the plurality of delta elements and the plurality of star elements.

4. The transformer system of claim 1, wherein:
   the antenna system to be coupled to said transformer star winding includes a plurality of antenna elements,
   the number of star elements in the plurality of star elements being substantially equal to the number of antenna elements in the plurality of antenna elements, and
   the number of delta elements in the plurality of delta elements being substantially equal to the number of antenna elements in the plurality of antenna elements.

5. The transformer system of claim 4, wherein:
   the antenna system to be coupled to said transformer star winding includes a plurality of radial elements interconnected by at least one circumferential element.

6. The transformer system of claim 4, further comprising:
   the antenna system coupled to the transformer star winding having a circumferential configuration integrally formed with said antenna system,
   said transformer delta winding having a loop configuration.

7. The transformer system of claim 1, further comprising:
   a plurality of amplifiers,
   each amplifier from the plurality of amplifiers being coupled to a corresponding delta element from the plurality of delta elements.

8. The transformer system of claim 1, wherein:
   said transformer star winding is formed by a first microstrip line configuration on a printed wiring board;
   said transformer delta winding is formed by a second microstrip line configuration on the printed wiring board; and
   said transformer star winding and said transformer delta winding being separated by an insulator layer.

9. A communication receiver system, comprising:
   a transformer system including:
      a transformer star winding having a plurality of star elements; and
      a transformer delta winding having a plurality of delta elements each being substantially perpendicularly disposed with a corresponding star element from the plurality of star elements; and
   an antenna system coupled to said transformer star winding, said antenna system receiving electromagnetic waves including a first electromagnetic wave having a carrier frequency and an electric field vector, the electric field vector having a terminus which traces a nonlinear path at a frequency between the carrier frequency and zero.

10. The communication receiver system of claim 9, wherein:
    said antenna system produces a first signal based on the received electromagnetic waves,
    said transformer system producing a second signal based on the first signal, said transformer system filtering components of the second signal corresponding to received electromagnetic waves from the group of linear polarized electromagnetic waves and elliptical electromagnetic waves.

11. The communication receiver system of claim 9, wherein:
    said transformer system filtering components of a signal corresponding to received electromagnetic waves from the group of linear polarized electromagnetic waves and elliptical electromagnetic waves,
    said transformer system passing components of the signal corresponding to the first electromagnetic wave.

12. The communication receiver system of claim 9, wherein said transformer star winding, said transformer delta winding and said antenna system are adapted to operate at radio frequencies (RF).

13. The communication receiver system of claim 9, further comprising
    a phase lock loop system coupled to the plurality of delta elements, the phase lock loop system providing a phase adjustment to a signal received from the plurality of delta elements, the phase adjustment corresponding to an offset from perpendicular between the plurality of delta elements and the plurality of star elements.

14. The communication receiver system of claim 9, wherein:

said antenna system includes a plurality of antenna elements, the number of star elements in the plurality of star elements being substantially equal to the number of antenna elements in the plurality of antenna elements, and the number of delta elements in the plurality of delta elements being substantially equal to the number of antenna elements in the plurality of antenna elements.

15. The communication receiver system of claim 14, wherein:

said antenna system includes a plurality of radial elements interconnected by at least one circumferential element.

16. The communication receiver system of claim 14, wherein:

the transformer star winding has a circumferential configuration integrally formed with said antenna system, said transformer delta winding has a loop configuration.

17. The communication receiver system of claim 9, further comprising:

a plurality of amplifiers, each amplifier from the plurality of amplifiers being coupled to a corresponding delta element from the plurality of delta elements.

18. The communication receiver system of claim 9, wherein:

said transformer star winding is formed by a first microstrip line configuration on a printed wiring board;

said transformer delta winding is formed by a second microstrip line configuration on the printed wiring board; and said transformer star winding and said transformer delta winding being separated by an insulator layer.

19. A communication transmitter system, comprising:

a transformer system including:

a transformer star winding having a plurality of star elements; and a transformer delta winding having a plurality of delta elements each being substantially perpendicularly disposed with a corresponding star element from the plurality of star elements; and an antenna system coupled to said transformer star winding, said antenna system sending electromagnetic waves including a first electromagnetic wave having a carrier frequency and an electric field vector, the electric field vector having a terminus which traces a nonlinear path at a frequency between the carrier frequency and zero.

20. The communication transmitter system of claim 19, wherein:

said transformer system receives a first signal and produces a second signal based on the first signal, said transformer system filtering components of the second signal that if otherwise transmitted by said antenna system would correspond to electromagnetic waves from the group of linear polarized electromagnetic waves and elliptical electromagnetic waves.

21. The communication transmitter system of claim 19, wherein:

said transformer system receives a first signal and produces a second signal based on the first signal, said transformer system filtering components of the second signal, said antenna system produces the first electromagnetic wave based on the second signal.

22. The communication transmitter system of claim 19, wherein said transformer star winding, said transformer delta winding and the antenna system adapted to operate at radio frequencies (RF).

23. The communication transmitter system of claim 19, further comprising a phase lock loop system coupled to the plurality of delta elements, the phase lock loop system providing a phase adjustment to a signal received from the plurality of delta elements, the phase adjustment corresponding to an offset from perpendicular between the plurality of delta elements and the plurality of star elements.

24. The communication transmitter system of claim 19, wherein:

the number of star element in the plurality of star elements being substantially equal to the number of antenna elements in the plurality of antenna elements, and the number of delta elements in the plurality of delta elements being substantially equal to the number of antenna elements in the plurality of antenna elements.

25. The communication transmitter system of claim 24, wherein:

said antenna system includes a plurality of radial elements interconnected by at least one circumferential element.

26. The communication transmitter system of claim 24, wherein:

the transformer star winding has a circumferential configuration integrally formed with said antenna system, said transformer delta winding has a loop configuration.

27. The communication transmitter system of claim 19, further comprising:

a plurality of amplifiers, each amplifier from the plurality of amplifiers being coupled to a corresponding delta element from the plurality of delta elements.

28. The communication transmitter system of claim 19, wherein:

said transformer star winding is formed by a first microstrip line configuration on a printed wiring board;

said transformer delta winding is formed by a second microstrip line configuration on the printed wiring board; and said transformer star winding and said transformer delta winding being separated by an insulator layer.

29. A transformer system, comprising:

means for converting electromagnetic waves into a first signal; and means for canceling components of the first signal to produce a second signal, the canceled components of the first signal corresponding to electromagnetic waves converted by said converting means from the group of linear polarized electromagnetic waves and elliptical polarized electromagnetic waves.

30. The transformer system of claim 29, wherein said canceling means includes:

means for establishing an electromagnetic field based on the first signal;

means for coupling the electromagnetic field to produce the second signal.

31. A method for performing two-dimensional filtering using a transformer system, comprising:

converting electromagnetic waves into a first signal; and canceling components of the first signal to produce a second signal, the canceled component of the first signal corresponding to electromagnetic waves converted by said converting means from the group of linear polarized electromagnetic waves and elliptical polarized electromagnetic waves.

32. The method of claim 31, wherein said canceling step further includes the following substeps:

(i) establishing an electromagnetic field based on the first signal; and (ii) coupling the electromagnetic field to produce the second signal.

33. A transformer system, comprising:

means for canceling components of a first signal to produce a second signal, the canceled components of the first signal that if otherwise transmitted would correspond to at least one electromagnetic wave from the group of linear polarized electromagnetic waves and elliptical polarized electromagnetic waves;

means for converting the second signal into electromagnetic waves having a carrier frequency and an electric field vector, the electric field vector having a terminus which traces a nonlinear path at a frequency between the carrier frequency and zero.

34. The transformer system of claim 33, wherein said canceling means includes:

means for establishing an electromagnetic field based on the first signal;

means for coupling the electromagnetic field to produce the second signal.

35. A method for performing two-dimensional filtering using a transformer system, comprising:

canceling components of a first signal to produce a second signal, the canceled components of the first signal that if otherwise transmitted would correspond to at least one electromagnetic wave from the group of linear polarized electromagnetic waves and elliptical polarized electromagnetic waves;

converting the second signal into electromagnetic waves having a carrier frequency and an electric field vector, the electric field vector having a terminus which traces a nonlinear path at a frequency between the carrier frequency and zero.

36. The method of claim 35, wherein said canceling step further includes the following substeps:

(i) establishing an electromagnetic field based on the first signal; and (ii) coupling the electromagnetic field to produce the second signal.

* * * * *